(12) United States Patent
Kerschbaum

(10) Patent No.: US 8,045,711 B2
(45) Date of Patent: Oct. 25, 2011

(54) SYSTEM AND METHOD FOR COMPARISON OF PRIVATE VALUES

(75) Inventor: Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/896,633

(22) Filed: Oct. 1, 2010

(65) Prior Publication Data

US 2011/0085658 A1    Apr. 14, 2011

Related U.S. Application Data

(63) Continuation of application No. 11/641,456, filed on Dec. 18, 2006, now Pat. No. 7,869,598.

(30) Foreign Application Priority Data

Jan. 2, 2006 (EP) ..................................... 06000007

(51) Int. Cl.
*H04L 9/00* (2006.01)
(52) U.S. Cl. .............................. 380/255; 380/28; 705/50
(58) Field of Classification Search .................... 705/50; 380/28, 255
See application file for complete search history.

(56) References Cited

U.S. PATENT DOCUMENTS

2007/0156586 A1   7/2007  Kerschbaum

FOREIGN PATENT DOCUMENTS

WO    WO-2005043808    5/2005

OTHER PUBLICATIONS

"U.S. Appl. No. 11/641,456 Notice of Allowance mailed Sep. 3, 2010", 16 pgs.
"U.S. Appl. No. 11/641,456, Non-Final Office Action mailed Mar. 3, 2010", 11 pgs.
"U.S. Appl. No. 11/641,456, Response filed May 18, 2010 to Non Final Office Action mailed Mar. 3, 2010", 14 pgs.
"European Search Report for Application No. 06000007.2-2415".
Kerschbaum, Florian , "A scalable approach for millionaires", *SAP Research*, 8 pgs.
Lin, Hsiao-Ying , "An efficient solution to the millionaires' problem based on homomorphic encryption", *ACNS 2005 : Applied Cryptography and Network Security, Lecture notes in computer science*, (2005),456-466.

*Primary Examiner* — Vivek Srivastava
*Assistant Examiner* — Thong Truong
(74) *Attorney, Agent, or Firm* — Schwegman, Lundberg & Woessner, P.A.

(57) ABSTRACT

An embodiment includes a first system for computing a contribution to a greater-than comparison of a first private value and a second private value. The first system includes: an accessing unit configured to access the first private value; a processor unit configured to compute a first encrypted value by encrypting the first private value, compute a decrypted value by decrypting a third encrypted value, and compute a contribution to a result of the greater-than comparison by checking a relation between the decrypted value and a modulus value; and a communication unit configured to send the first encrypted value to a second system and to receive the third encrypted value.

17 Claims, 5 Drawing Sheets

| | Mill. | Fi. 56 |
|---|---|---|
| Mod. Exponentiations | 99% | - |
| Mod. Multiplications | 0% | 21% |
| Jacobu symbol | - | 71% |
| Other | 1% | 8% |

SYSTEM AND METHOD FOR COMPARISON OF PRIVATE VALUES

CLAIM OF PRIORITY

This application is continuation of U.S. application Ser. No. 11/641,456, now U.S. Pat. No. 7,869,598 filed Dec. 18, 2006 which claims the priority benefit of the filing date of European Application (EPO) No. 06000007.2 filed Jan. 2, 2006, which applications are incorporated in their entirety herein by reference.

TECHNICAL FIELD

The present application generally relates to the field of electronic data processing and more particularly to data encryption.

BACKGROUND

In recent years, processing of electronic data has increased continuously. With the processing of the data also the exchange of the data has increased. This is also true for data that have to be protected against unauthorized reading or writing of the data. For this, encryption systems have been developed that are widespread, for example, public key encryption systems.

Private data are data that an owner of the private data does not want to share with a further party. Such private data may for example be legally protected because they may belong to a protected privacy area of a person. In a further example, private data may also be an amount of money that a person is willing to pay for an acquisition of an object. Furthermore, private data may also be a demanded amount of money for which a further person is willing to sell the object.

Yao's millionaires problem involves a comparison of private data. In an article with title "Protocols for Secure Computations" for the Proceedings of the annual IEEE Symposium on Foundations of Computer Science 23, 1982, A. Yao defined the millionaire's problem: two millionaires want compare an amount of money that each one has without revealing the amount of money to each other. A plurality of solutions has been suggested to Yao's millionaire problem some of which involve a third party. Such a third party has to be found by the two millionaires and may not be available. Two-party solutions involve only the two parties that own the two private values that are desired to be compared. An efficient two-party solution has been described by M. Fischlin in a publication titled "A Cost-Effective Pay-Per-Multiplication Comparison Method for Millionaires" in RSA Security Cryptographer's Track, 2001. The solution is efficient, that is, allows for a high-performance computation of a comparison of two private values. The solution has a probability for an incorrect result of the comparison, but the probability can be reduced to low values by using variants of the solution that require more computational efforts.

DETAILED DESCRIPTION

Figure 1A:
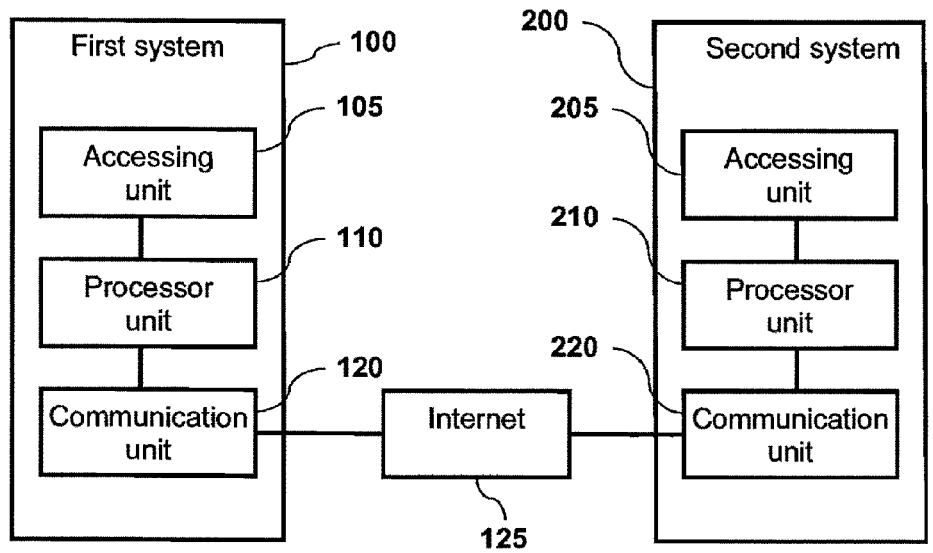
FIG. 1A shows components of embodiments of the invention.

Following examples and exemplary embodiments may have specific features for illustrative purposes. The specific features are not intended to limit the scope of the invention or to be exhaustive regarding embodiments of the invention.

An embodiment is related to two private values owned by two parties. The parties desire to do a comparison between the private values so that a privacy of each one of the private values is conserved, that is, without revealing the private values to the other party. Furthermore, the parties may desire that a result of the comparison is not known to one party alone but that each one of the parties has a contribution to the result so that the result is only available using the contributions of the two parties. The first aspect includes that one of the parties, that is, a first party has access to a first private value and computes the contribution to the result of the comparison.

A further embodiment relates to the other party, which is, a second party having access to a second private value and provide the second value in such a way that the accessible private value can be used for the comparison and is not revealed to the first party.

According to one example embodiment, a first system is disclosed for computing a contribution to a greater-than comparison. A result of the greater-than comparison may include a statement that the first private value accessible to the first system is larger than the second private value accessible to a second system. A further result of the greater-than comparison may include that the statement is not true, that is, the second private value is greater than or equal to the first private value. The first system provides the first private value in such a form that it is not revealed to the second system. Furthermore, the first system receives the second private value in such a form that the second private value is not revealed to the first system but can be used for the contribution to the greater-than comparison. A role of the first system and the first party may be exchanged with role of the second system and the second party so that the greater-than comparison can be done in a desired form.

The first system is secure because the private value accessible to the first system is inaccessible to a further party, that is, the first private value is secured by an encryption system with a widely accepted level of security. Furthermore, the second private value accessible to the second system is inaccessible to the first system, that is, the second private value is secured against an access of the first system or an owner of the first system. Securing the second private value means that a security level is provided by blinding the second private value using a random variable. The first system is reliable, that is, it computes the contribution to the comparison with a low probability of an error that can be reduced to zero. The first system is efficient because the computation is high-performance, also compared to computations according to prior art solutions. The first system is further efficient because a small amount of data have to be exchanged between the systems.

According to an example embodiment, the second system is disclosed for providing the second private value. The second system receives the first private value in such a form that it is not revealed to the second system. The second system uses the form in which the first value is revealed to calculate a form of the second value that is provided to the first system and that does not reveal the second private value to the first system. However, the first system can use the form of the second private value to compute a contribution to the greater-than comparison.

The second system is secure by using an encryption system providing security in the same sense that the first system is secure. Furthermore, the second system is more high-performance compared to prior art solutions because of computations and data exchanges according to the disclosed second system.

According to an example embodiment, a first method is disclosed for computing the contribution to the greater-than comparison. The first method has desired features regarding security, reliability and efficiency of the first system.

According to an example embodiment a second method is disclosed for providing the second private value. The second method has desired features regarding security and efficiency of the second system.

Further embodiments include computer program products that rely on features of the first method and the second method.

FIG. 1A shows components of embodiments of the invention. One embodiment is a first system 100 with components, that is, an accessing unit 105, a processor unit 110, and a communication unit 120. A further embodiment is a second system 200 with an accessing unit 205, a processor unit 210, and a communication unit 220. Lines between components of the first system 100 or the second system 200 represent interfaces configured to exchange data in both directions between the components.

Figure 1B:
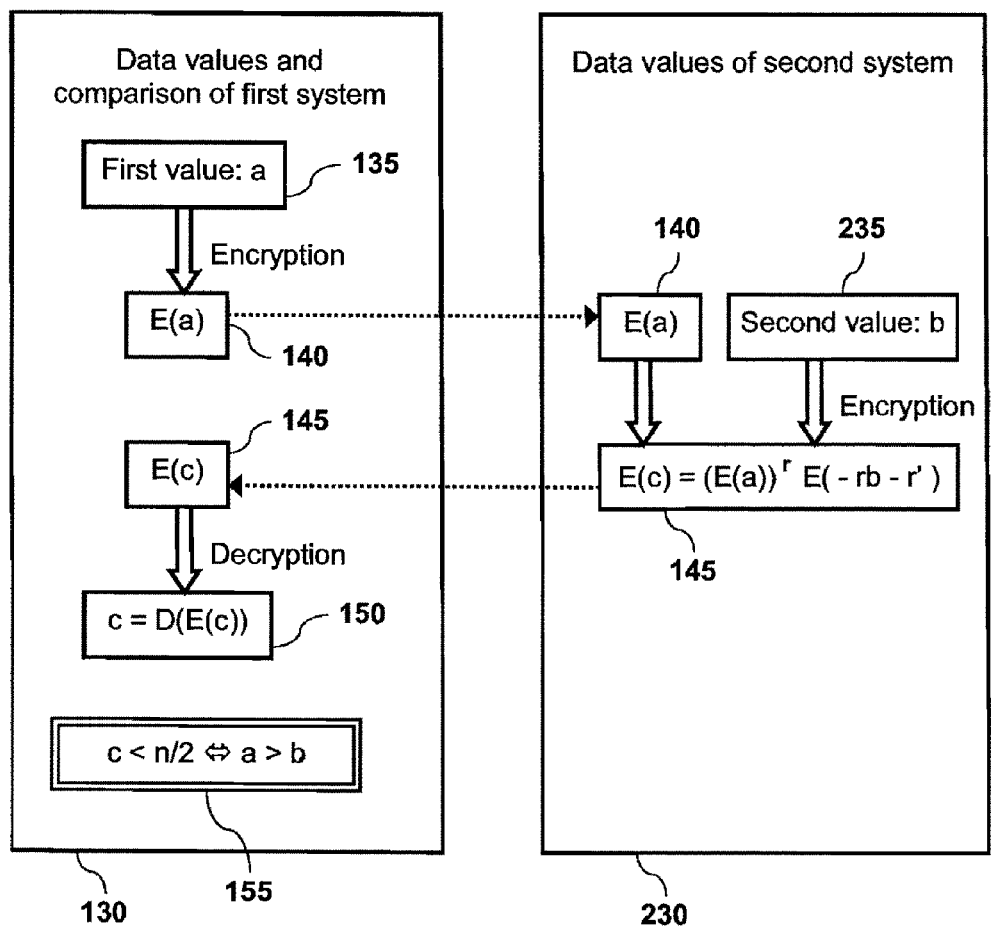
FIG. 1B shows elements relevant to embodiments of the invention.

FIG. 1B shows elements relevant to the embodiments of the invention. The first system 100 (see FIG. 1A) has elements 130 that include data values and a comparison relevant to the first system 100. The second system 200 (see FIG. 1A) has elements 230 that include data values relevant to the second system 200.

The first system 100 is an exemplary system for computing a contribution to a greater-than comparison of a first private value a 135 and a second private value b 235. In the example, the system 100 and the system 200 are computer systems. The first private value a 135 is accessible to the first system 100 and is a part of the elements 130. The second private value b 235 is accessible to the second system 200 and is a part of the elements 230. The first private value a 135 is private, that is, it is inaccessible by the second system 200 or a further unauthorized system. The first private value remains private, that is, one or more aspects may be revealed through the greater-than comparison, however, a precise knowledge about the first private value may not be revealed to the second system 200 or a further unauthorized system. Accordingly, the second private value b 235 is private, that is, it is inaccessible by the first system 100 or a further unauthorized system. The second private value remains private, that is, one or more aspects may be revealed through the greater-than comparison, however, a precise knowledge of the second value may not be revealed to the first system 100 or a further unauthorized system.

The first system 100 includes the accessing unit 105 (see FIG. 1A) that is configured to access the first private value a 135. The accessed first private value a 135 can then be provided to further components of the system 100. In an example, the accessing unit may include a random access memory (RAM) storage system that stores the first private value a 135. In further examples, it may include a hard disc drive or a further, external computer system that has an access to the first private value a 135.

The first system 100 includes the processor unit 110 (see FIG. 1A) configured to compute a first encrypted value E(a) 140 by encrypting the first private value a 135. The first private value a 135 can be transferred from the accessing unit 105 to the processor unit 110 through an interface. In the example, the processor unit may be central processing unit (CPU) connected to the accessing unit through an internal bus system. In further examples, the interfaces may be an external interface for connecting external accessing units to the processing unit.

The first private value a 135 is encrypted by using a homomorphic encryption function of an encryption system and a public key. In the example, the first private value a 135 and the first encrypted value E(a) 140 are parts of elements 130 relevant to the system 100. The processor unit is further configured to compute a decrypted value c 150 by decrypting a third encrypted value E(c) 145 using a decryption function of the encryption system and a private key. The third encrypted value E(c) 145 is transferred from the communication unit 120 (see FIG. 1A) through an interface. The decryption function and the private key are configured to decrypt values that have been encrypted by the encryption function and the public key. The decrypted value c 150 is configured to contribute to a result of the greater-than comparison 155 through a comparison with a modulus value n of the public key.

A homomorphic encryption function is an encryption function for which the following equations describing the homomorphy feature are valid:

$$E(x)E(y) = E((x+y) \bmod n) \text{ and}$$

$$(E(x))^y = E((x\,y) \bmod n), \text{ with}$$

mod being the modulus function and
n being the modulus value of the encryption.
The modulus value n may also be called the Ravest-Shamir-Adleman (RSA) modulus of the encryption and is a part of the public key.

The encryption function E is an example of a public key encryption function that uses a public key to encrypt a value x to give an encrypted value E(x). The encrypted value E(x) may be decrypted using a decryption function D with a private key that is related to the public key. With the private key it is D(E(x))=x. There are multiple examples for such encryption functions, however in embodiments of the invention homomorphic encryption functions of encryption systems are used such as Paillier's encryption system, Naccache-Stern encryption system, Okomoto-Uchiyama encryption system, or Benealoh encryption system.

In the example, the encryption system is Paillier's encryption system that has been published by P. Paillier in a contribution titled "Public-Key Cryptosystems Based on Composite Degree Residuousity Classes" to Proceedings of Eurocrypt, 1999. A reason is that Paillier's encryption system can be calculated in an efficient way. Paillier's encryption has a further feature that is an optional feature of embodiments of the invention, that is, the homomorphic function is a randomized homomorphic function so that encrypted values are semantically secure. A semantically secure encryption function does not reveal information about the original value through the encrypted value. This provides further security because knowing the encrypted value it is not possible to guess the original value by encrypting trial values and comparing the result for the trial values with the encrypted value. The further security may be desired because in case that the private values are small it may be possible to use trial values to guess a private value. This can be demonstrated in an example: encrypting an original value involves an individual and specific randomization that is not available to further encryptions so that encrypting a trial value may give a different encrypted value even if the trial value is equal to the original value.

In the example, the private values are integer values. In case that one of the private values is not an integer value the parties accessing the private values may agree on an exchange of data so that both private values become integer values. The exchange of data may be done without changing a greater-than relation between the private values and without revealing the private values in an undesired way. As an example, the parties may agree on a positive common factor with which each one of the private values is multiplied. The common factor does not change a result of the greater-than comparison and does not reveal a magnitude of any one of the private values.

In Paillier's encryption scheme an original value x may be encrypted through calculating $(g^{}x)(R^{}n) \mod(n^{}2)$, wherein g is a generator modulo n, that is, there is no common divisor of g and a product $(p-1)(q-1)$. n is a large integer with prime divisors p and q, and R is a random number so that the encryption is semantically secure. The public key includes the generator and the modulus value n, that is, the pair (g, n). The private key includes the generator g and the factorization of the modulus value n, that is, the triple (g, p, q). Therefore, the modulus value n has to be large so that calculating the factorization is not feasible based on available computing resources. An encrypted value e for which it is true $e < n^{}2$ can be decrypted through calculating $(L((e^{}1) \mod n^{}2)/L((g^{}1) \mod n^{}2)) \mod n$, wherein function L is defined by $L(u)=(u-1)/n$ and 1 is related to Carmicheal's function 1 cm depending on the factorization of n:$1=1$ cm $(p-1, q-1)$. Therefore, the decryption is not dependent on R, that is, on the randomization of the encryption leading to semantically secure encrypted values.

In the example, the processor unit 110 is further configured to compute a contribution to a result 155 of the greater-than comparison. Computing the contribution includes checking a relation between the decrypted value 150 and a modulus value of the public key. In the example, the relation is that the decrypted value c 150 is less than half of the modulus value and a positive result of checking the relation is equivalent to the first private value a 135 being greater by one or more than the second private value b 235. In the example, the private values are integers so that the greater-than comparison of the private values is precise to the smallest possible unit, that is, to one. The relation is equivalent to the greater-than comparison, that is, in case that the decrypted value c 150 is less than half of the modulus value it follows that that a>b and in case that the decrypted value c 150 is not less than half of the modulus value it follows that that a is not greater than b, that is, a is less than or equal to b.

The system further includes a communication unit 120 configured to send the first encrypted value E(a) 140 to the second system 200 and to receive the third encrypted value E(c) 145. In the example, the processor unit 110 and the communication unit have an interface for exchanging data such as the first and the third encrypted values. In the example, the communication unit 120 sends data to and receives data from the system 200 through the Internet 125. The communication system may include an external interface to connect the communication unit 120 to an internet server and a controller of the external interface.

In the example, the processing unit 110 is further configured to determine a domain comprising the first private value a 135 and the communication unit 120 is further configured to send the domain to the second system 200. The domain may be determined to be much greater than the first private value and an expected magnitude of the second private value so that knowledge of the domain does not does not give a hint to a magnitude of the private values. As an example, the domain may have a lower limit of zero and an upper limit that is at least one million times larger than the first private value. The first system may transmit the domain to the second system and receive from the second system an affirmation that the domain also includes the second private value. In case that such an affirmation is not received the first system may determine a greater domain so that also the second private value is included in the greater domain and an affirmation is received for the greater domain. In the example, the system is further configured to receive information about a domain that comprises the first private value a 135 and the second private value b 235. Therefore, in a further situation, the first system may receive a greater domain from the second system which includes the second value. Receiving the greater domain may be interpreted in such a way that the second private value is greater than the first private value but such an interpretation is inconclusive. In both cases the resulting domain has a lower limit l_1 and an upper limit u_1 so that the first private value and the second private value are included in the resulting domain.

In the system 100, the processing unit 110 is further configured to determine the modulus value from a difference between an upper limit of the domain and a lower limit of the domain so that the greater-than comparison is error-free. Therefore, the modulus value n is determined to be greater than $2((u\_1-l\_1)^{}3+(u\_1-l\_1)^{}2)$ so that the comparison is error-free.

The second system 200 is an exemplary system for providing a second private value to the greater-than comparison of the first private value a 135 and the second private value b 235.

The second system 200 includes the accessing unit 205 (see FIG. 1A) that is configured to access the second private value b 235. Embodiments of the accessing unit 205 may be according to embodiments of the accessing unit 105 of the first system.

The second system 200 further includes the communication unit 220 (see FIG. 1A) configured to receive the first encrypted value E(a) 140 computed by encrypting the first private value a 135 and to send the third encrypted value E(c) 145 to the first system 100. In the example, the communication unit 220 exchanges data through the Internet 125 with the first system and embodiments of the communication unit 220 may be according to embodiments of the communication unit 120 of the first system.

The second system 200 further includes a processing unit 210 (see FIG. 1A) that is configured to compute the second encrypted value by encrypting a randomized value using the homomorphic encryption function E and the public key. The randomized value is calculated from a first random value r that is greater than zero and the second private value b 235. In the example, the randomized value is computed by adding a negative value of a product of the first random variable r and of the second private value b 235 to a negative value of a second random variable r', that is, the randomized value is equal to −rb−r'. The second random variable r' is larger than zero and less than the first random variable r. The second encrypted value is therefore E(−rb−r'). In a further example, the randomized value may be equal to a negative value of a product of the first random variable r and of the second private value b 235, that is, equal to −rb. The example uses the second random variable so that the first system may not conclude from the fact that the decrypted value c is equal to zero that the first private value a is equal to the second private value b. The processor unit 210 is further configured to compute the third encrypted value E(c) 145 comprising a function of a product of the first encrypted value E(a) 140 to the power of the first random value r and of the second encrypted value. In the example, the third encrypted value E(c) 145 is equal to the product of $(E(a))**r$ and of the second encrypted value $E(-rb-r')$.

In the example, the communication unit 220 is further configured to receive information about a domain from the first system and to send information about a domain including the second private value to the first system. Therefore, the communication unit 220 may receive a lower limit and an upper limit for the first private value from the first system and check that the limits are also limits of the second private value. In case of a positive result, the second system may send an affirmation to the first system that the domain also includes the second private value. In case of a negative result, the second system may send a further upper limit and a further lower limit that include also the second private value to the first system. In a further example, the communication unit 220 may be configured to receive information about a domain that includes the first private value and the second private value. In the further example, the processing unit 210 may be further configured to determine a lower limit for the modulus value from a difference between an upper limit of the domain and a lower limit of the domain so that the greater-than comparison is error-free. In the further example, the communication unit 220 may be further configured to send the lower limit for a modulus value of the public key to the first system so that the first system may determine a modulus value that is greater than the lower limit. The processing unit 210 may determine the lower limit so that it is greater than $2((u\_1-l\_1)3+(u\_1-l\_1)2)$, wherein u_1 is the upper limit of the domain and l_1 is the lower limit of the domain.

Figure 2:
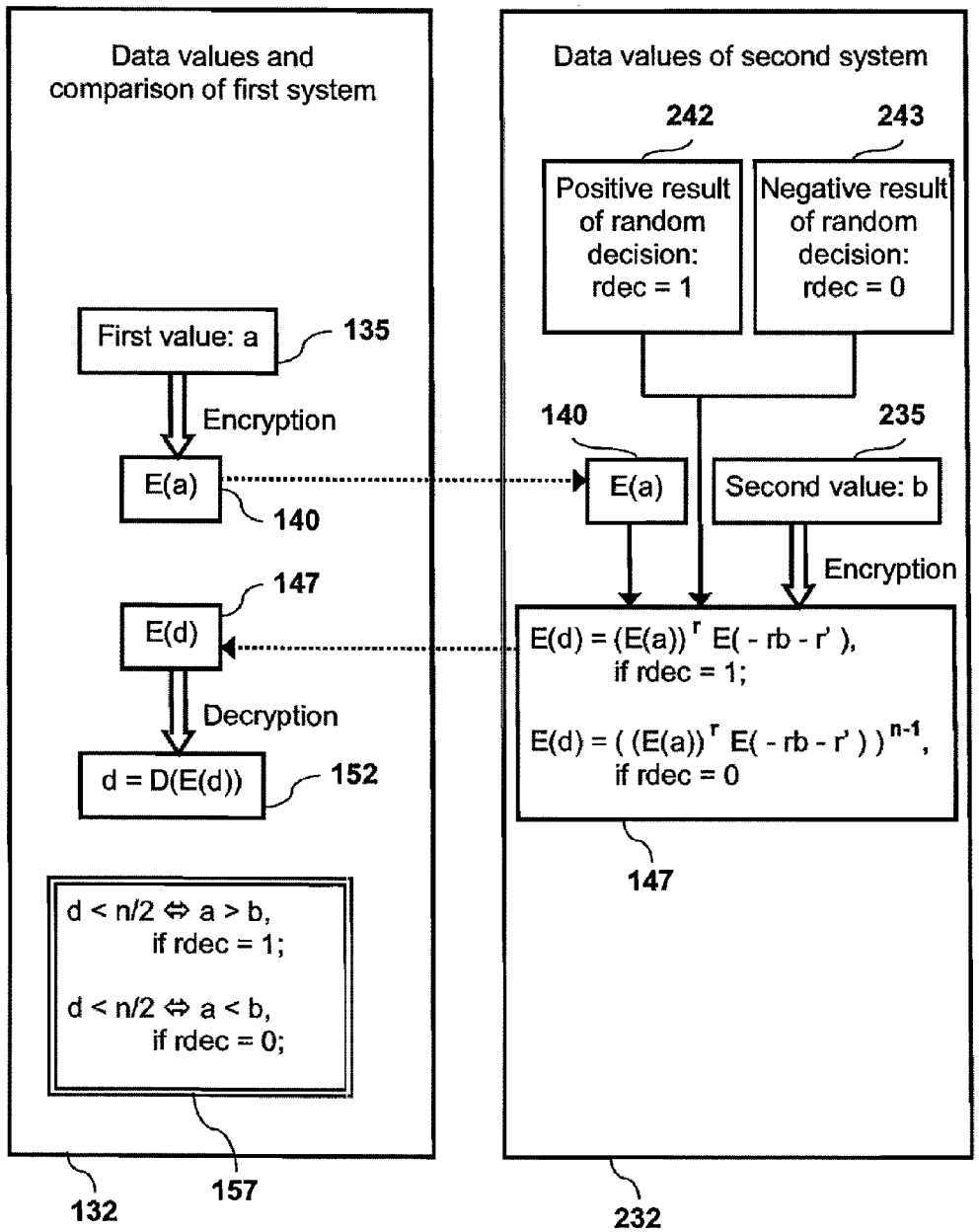
FIG. 2 shows elements relevant to further embodiments of the invention.

FIG. 2 shows elements relevant to further embodiments of the invention. Elements 132 are relevant to a further embodiment of the system 100 and elements 232 are relevant to a further embodiment of the system 200.

The further embodiment of the system 100 has identical components of the embodiment of the system 100 according to FIG. 1A. Furthermore, the further embodiment has the first private value a 135 and the first encrypted value E(a) 140. Features of the further embodiment such as the modulus value n and using random variables may be identical to features of the embodiment if not stated otherwise. The third encrypted value E(d) 147 has been computed in a further way by the further embodiment of the second system 200. Computing the decrypted value d 152 from the third encrypted value E(d) is identical to the embodiment computing the decrypted value c 150 (see FIG. 1B) from the third encrypted value E(c) 145 (see FIG. 1B). Also, the relation is that the decrypted value 152 is less than half of the modulus value n. However, the decrypted value d 152 has different meaning because from the relation follows that a positive result of checking the relation and the decrypted value 152 being computed according to a positive result 242 of a random decision is equivalent to the first private value a 135 being greater by one or more than the second private value b 235. However, it also follows that a positive result of checking the relation and the decrypted value being computed according to a negative result 243 of the random decision is equivalent to the second private value b 235 being greater by one or more than the first private value a 135. Therefore, the second system can only compute a contribution to the greater-than comparison, that is, the part relating to the relation between the decrypted value d and the modulus value n. Without further knowledge about the result of the random decision the first system is not able to determine if a>b is true or if a<b is true. This is desired in the further embodiment of the first system and the further embodiment of the second system.

In the further embodiment of the second system 200, the third encrypted value 147 is equal to the product, that is, $E(d)=((E(a))r)E(-rb-r')$ in case of a positive result 242 of a random decision, that is, rdec=1. However, the third encrypted value 147 is equal to the product to the power of a modulus value of the public key reduced by one, that is, $E(d)=(((E(a))r)E(-rb-r'))**(n-1)$ and in case of a negative result 243 of the random decision, that is, rdec=0.

Therefore, the result of the greater-than comparison requires the result of the relation between the decrypted value and the modulus value computed by the first system and the result of the random decision made by the second system. In an example, the first system may give the result of the relation to the second system so that the second system can compute a final result of the greater-than comparison. In a further example, the second system may give the result of the random decision to the first system so that the first system can compute a final result of the greater-than comparison.

Greater-than comparisons according to the embodiments of the first and second system or according to the further embodiments of the first and second system are solutions for Yao's millionaire problem. In addition to millionaires there are further examples of parties that have private values and desire to compare the private values with private values of different parties. A further example is the person willing to pay a private amount of money for the acquisition and the person willing to sell the object as long as a private demanded price is paid. The two persons may desire to execute the acquisition in case the private amount is higher than the demanded price. The two persons may do such a greater-than comparison before starting to negotiate a final price so that no private value is revealed in case that no acquisition is executable. Furthermore, the two persons may desire to start negotiating without the other person knowing the own private value. A further example may involve telephone bills of employees of a company. Parts of the bills may be analysed according to specific criteria and while an exact amount of a part of a bill may treated as a private value it may be desired to check that a limit value is not exceeded. The limit value may be treated as private, too, because the limit may change and in order to prevent an adaptive behaviour an employee is not supposed to know the limit.

Figure 3:
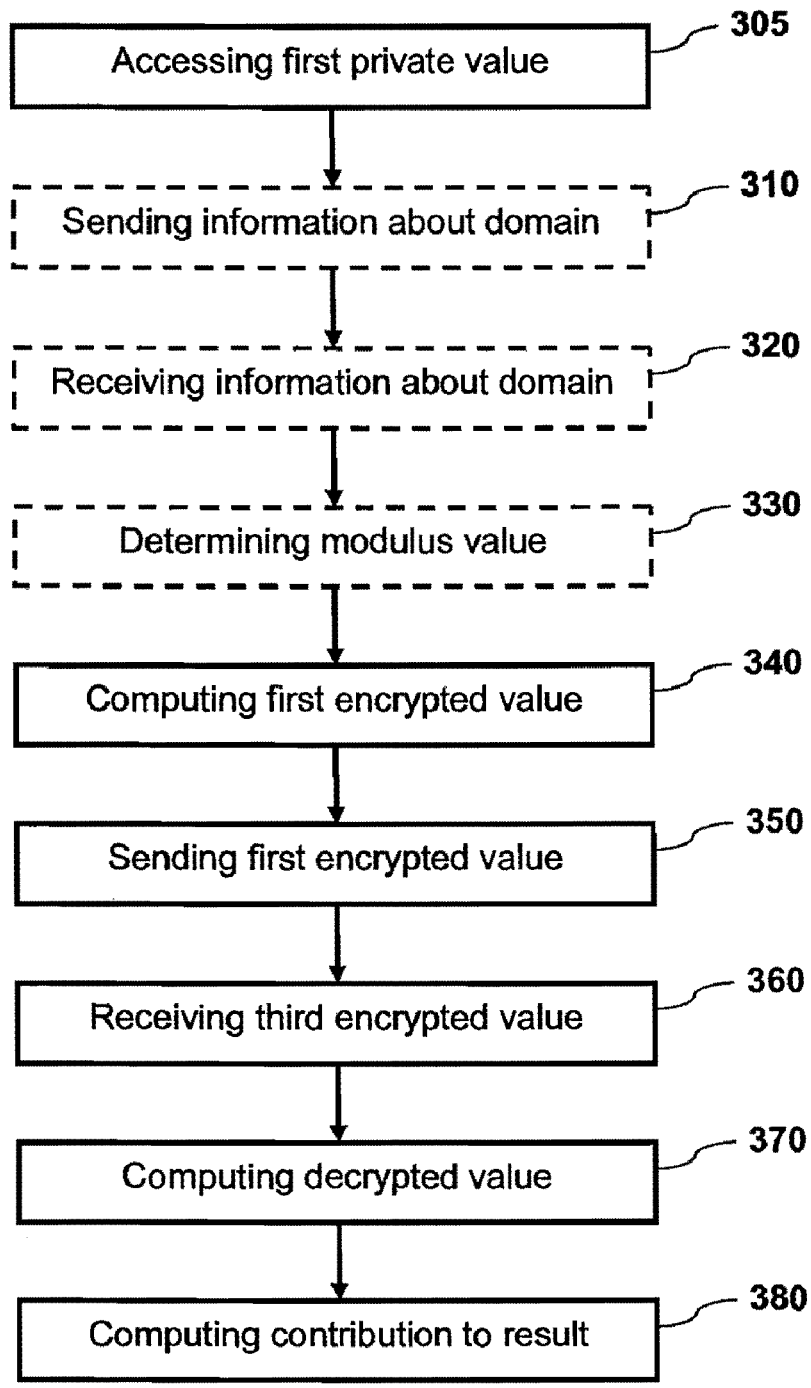
FIG. 3 is a simplified flow diagram of method operations according to an embodiment of the invention.

FIG. 3 is a simplified flow diagram of method operations according to an embodiment of the invention. The embodiment is a first computer-implemented method 300 for computing the contribution to the greater-than comparison. As in previous embodiments, the first private value a 135 is accessible to the first party and the second private value b 235 is accessible to the second party. Optional method operations of the embodiment are displayed with dashed lines. Elements such as data values and comparisons that are relevant to embodiments of the first method have reference signs that refer to the elements 130 (see FIG. 1B) of the first system.

The method has method operation accessing 305 the first private value a 135. Accessing may include requesting the first private value from an internal storage device or from an external storage device.

Following optional method operations are sending 310 information about a domain that includes the first private value 135 to the second party and receiving 320 information about a domain that includes the first private value 135 and the second private value 235. In the example, the first private value is used to determine the limits of the domain. The limits are sent as information about the domain to the second party so that the second party can affirm that the limits are valid for the second private value or suggest new limits. An affirmation of the limits or the new limits is received as information about the domain that includes both private values. It follows determining the modulus value from a difference between the upper limit of the domain and the lower limit of the domain so that the greater-than comparison is error-free. This may be achieved by selecting the lower limit of the domain to the greater than $2((u\_1-l\_1)3+(u\_1-l\_1)2)$.

It follows method operation computing 340 first encrypted value E(a) 140 by encrypting the first private value a 135 using the homomorphic encryption function and the public key. In the embodiment the homomorphic function is according to Paillier's encryption scheme and has therefore the optional feature to be semantically secure.

It follows sending 350 the first encrypted value E(a) 140 to the second party, receiving 360 the third encrypted value E(c) 145 from the second party, and computing 370 the decrypted value c 150 by decrypting the third encrypted value E(c) 145. Decrypting includes using the decryption function and the private key that are configured to decrypt values that have been encrypted by the encryption function and the public key.

A following method operation is computing 380 the contribution to the result 155 of the greater-than comparison by checking the relation between the decrypted value c 150 and the modulus value n of the public key. In the example, the relation is that the decrypted value c 150 is less than half of the modulus value and a positive result of checking the relation is equivalent to the first private value a 135 being greater by one or more than the second private value b 235.

In a further embodiment of the first method the relation is that the decrypted value d 152 is less than half of the modulus value. A positive result of checking the relation and the decrypted value d 152 being computed according to a positive result 242 of a random decision is equivalent to the first private value a 135 being greater by one or more than the second private value b 235. However, a positive result of checking the relation and the decrypted value 152 being computed according to a negative result 243 of the random decision is equivalent to the second private value b 235 being greater by one or more than the first private value a 135.

Figure 4:
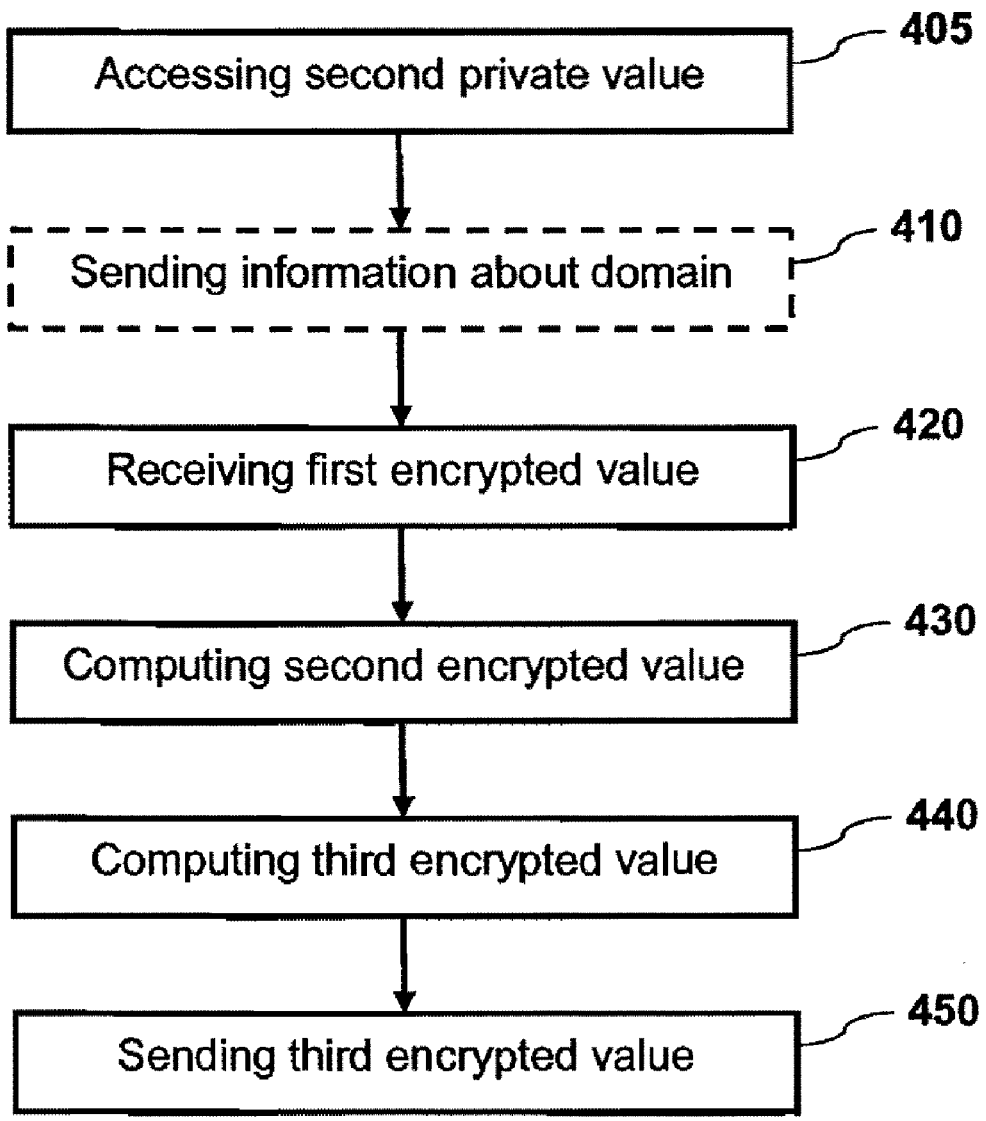
FIG. 4 is a simplified flow diagram of method operations according to a further embodiment of the invention.

FIG. 4 is a simplified flow diagram of method operations according to a further embodiment of the invention. The further embodiment is a second computer-implemented method 400 for providing the second private value 235 to the greater-than comparison. Optional method operations of the embodiment are displayed with dashed lines. Elements such as data values and comparisons that are relevant to embodiments of the second method have reference signs that refer to the elements 230 (see FIG. 1B) relevant to the second system.

The second method includes method operation accessing 405 the second private value b 235 that may include requesting the second private value from an internal storage device or from an external storage device.

In the example, a following method operation is sending 410 information about a domain including the second private value b 235 to the first party. The information may be for example a lower limit and an upper limit of the domain of which the second private value is an element. The domain may be selected so large that hardly any knowledge about the magnitude of the second private value is revealed. In the example, the method may receive a specification of a suggested domain that includes the first private value. In such a case the information about the domain may be an affirmation that the suggested domain includes also the second private value.

In a further embodiment, method operations may include receiving limits of a domain valid for the first private value and determine limits of a domain that includes the first and the second private value. The determined limits may be identical to the received limits in case that the received limits include the second private value. In the further embodiment, it follows determining the lower limit of the modulus value of the public key from the limits of the domain so that the greater-than comparison is error-free. It may follow method operation sending the limit of the modulus value to the first party so that the first party may determine the modulus value in accordance with the lower limit.

In the embodiment, it follows receiving 420 the first encrypted value E(a) 140 computed by encrypting the first private value a 135 using the semantically secure homomorphic encryption function E according to Paillier's encryption scheme and the public key.

A following method operation is computing 430 the second encrypted value by encrypting a randomized value using the encryption function E and the public key. The randomized value is calculated from a first random variable r that is greater than zero and the second private value b 235. In the example, the randomized value is computed by adding a negative value of a product of the first random variable r and of the second private value b 235 to a negative value of a second random variable r'. The second random variable r' is greater than zero and less than the first random variable r. In a further example, the randomized value may be equal to a negative value of a product of the first random variable r and of the second private value b 235. In the example, the third encrypted value 145 is equal to the product.

It follows computing 440 the third encrypted value E(c) 145 sending 450 the third encrypted value E(c) 145 to the first party.

In a further example, the third encrypted value E(d) 147 (see FIG. 2) may depend on a result of a random decision that has two possible results. The third encrypted value E(d) 147 may be equal to the product in case of a positive result 242 of the random decision. However, the third encrypted value E(d) 147 may be equal to the product to the power of a modulus value of the public key reduced by one in case of a negative result 243 of the random decision.

Figures 5A, 5B:
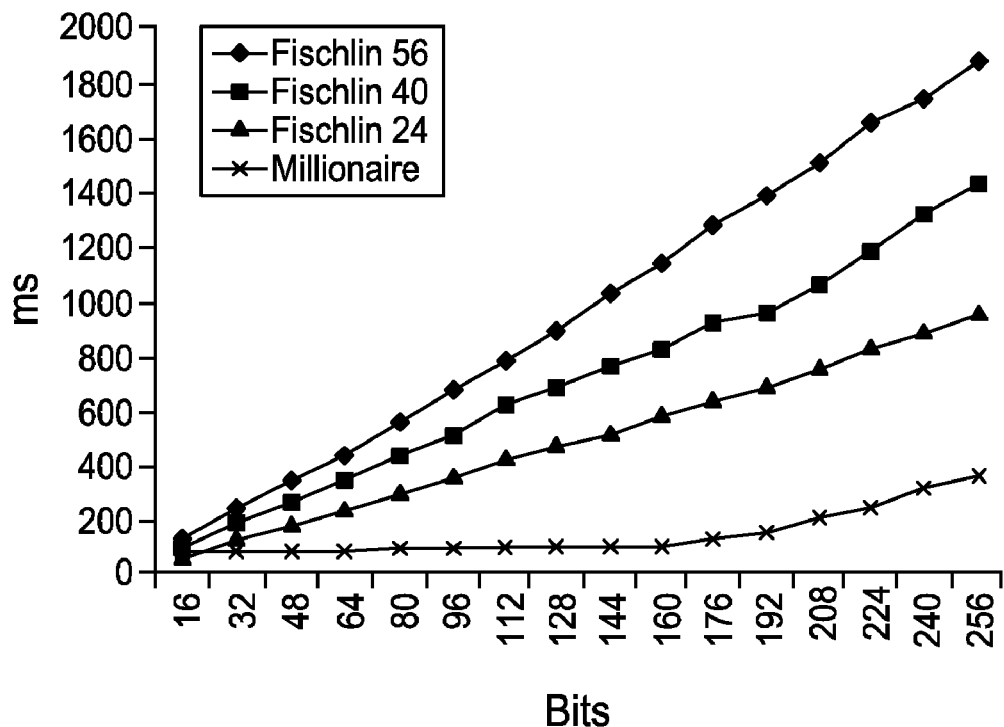
FIG. 5A compares performance results of an embodiment of the invention with prior art solutions.
FIG. 5B compares dominant contributions to performance results of implementations according to the invention and according to prior art solutions.

FIG. 5A compares performance results of an embodiment of the invention with prior art solutions. Protocols of the prior art solutions are implemented according to the publication of M. Fischlin specified previously and are named Fischlin 56, Fischlin 40, and Fischlin 24. A protocol implemented according to embodiments of the invention is named Millionaire. The different protocols are implemented to compare performances and therefore the different protocols are implemented to correspond to each other. The implementation was done in Java and evaluated on a computer with a 1.6 GHz Pentium Mobile processor and 1 GB of RAM running Windows XP using version 1.4.2 of Sun's Java SDK.

The implementation of Fischlin's scheme is based on an optimized version which provides a performance improvement compared to a prior version using more re-randomization steps. The algorithm for computing the Jacobi symbol for decryption is done according to a publication of E. Bach and J. Shallit, titled "Algorithmic Number Theory". No sanity checks are performed, for example, on the well-formedness of messages. Instead, the performance of each implementation is optimized within a specification of a protocol. Therefore, the decryption of the Goldwasser-Micali (GM) encryptions is reduced to one Jacobi computation modulo an RSA prime factor per cipher-text. For the GM encryption a 512-bit RSA modulus is used. Fischlin's scheme is implemented with three different parameters for a probability of an error: $2^{}(-24)$, $2^{}(-40)$, and $2^{**}(-56)$. The different implementations are denoted according to the probability of the error as Fischlin 24, Fischlin 40 and Fischlin 56.

A further implementation of a protocol is according to a publication of D. Malkhi et alter titled "A secure Two-party Computation System" in Proceedings of the 13th USENIX Security Symposium, 2004. The further implementation has a performance result that is an order of magnitude slower than Fischlin's scheme and therefore is not included in the comparison. Furthermore, the further implementation uses network communication and has a setup phase that is not part of measurements.

For methods implemented according to the invention a formula is used to compute the key length of Paillier's encryption scheme bits_n from the bit length bits_m of the numbers to be compared. The formula is bits_n=max(512, 32(int(bits_m/32)+2)) which is in accordance with a lower limit for the modulus value as specified previously. The choice of a minimum key-length of 512-bit seems to be acceptable for low security requirements because RSA keys with more than 640 bits have been successfully factored. The implementations of the methods according to the invention have been optimized in multiple ways. First, the pre-computation of the dividend for decryption is done as has been suggestion in Paillier's publication specified previously. Second, a modular exponentiation is saved by not randomizing the encryption of the second private value b, that is, the random value R of Paillier's scheme is set to one. Therefore, the encryption is not semantically secure but the randomization done by the multiplication of the second private value b with first random variable r is sufficient. This leaves five modular exponentiations: two for encryption of a, one for multiplying with r, one for subtracting b, and one for decrypting c. All modular exponentiations are done modulo $n^{**}2$.

From the performance results of the implementations in FIG. 5A it follows that the implementation according to the invention is more high-performance than the prior art implementations. The differences between the implementation according to the invention and the prior art implementations depend on the number of bits in the binary representation of the private values and on the prior art implementation. The prior art implementations are high-performance compared to further prior art implementations. However, the performance of the implementation according to the invention is better for numbers with more than 16 bits. The performance of the implementation according to the invention improves for larger private values regarding the prior art solutions and becomes better by an order of magnitude for numbers with 256 bits compared to Fischlin 56. Furthermore, the implementation according to the invention has a zero probability of an error, that is, it is more reliable.

FIG. 5B compares dominant contributions to performance results of the implementations according to the invention and according to a prior art solution. The implementation according to the invention is denoted as Mill. and the implementation according to Fischlin's scheme Fischlin 56 is denoted as Fi. 56. The results for running times of the implementations are from computations for 160 bit values, that is, private values that are represented by 160 bits.

The running time of the implementation according to the invention is dominated to 99% by the cost of modular exponentiations. Such a computation does not contribute to a running time or a prior art implementation. However, a dominating factor for the running time of the prior art implementation is the computation of the Jacobi symbol.

As noted above, embodiments within the scope of the present invention include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. In case that the computer-executable instructions are transformed, a first computer may for example transform the computer-executable instructions into the executable format and a second computer may execute the transformed instructions.

The invention is described in the general context of method steps, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing operations of the methods disclosed herein. The particular sequence of such executable instructions or associated data structures represents examples of corresponding acts for implementing the functions described in such steps.

The present invention in some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison operations and decision steps. It should also be noted that the word "component" as used herein and in the claims is intended to encompass implementations using one or more lines of software code, hardware implementations, or equipment for receiving manual inputs.

The invention claimed is:

1. A second system for providing a second private value to a greater-than comparison of a first private value and the second private value, the second system comprising:
   an accessing unit configured to access the second private value;
   a communication unit configured to receive a first encrypted value computed by encrypting the first private value using a homomorphic encryption function and a public key and send a third encrypted value to the first system; and
   a processing unit configured to compute a second encrypted value by encrypting a randomized value using the homomorphic encryption function and the public key, the randomized value being calculated from a first random variable and the second private value and compute the third encrypted value comprising a function of a product of the first encrypted value to the power of the first random value and of the second encrypted value, wherein the first random variable is greater than zero.

2. The second system of claim 1 wherein the randomized value is equal to a negative value of a product of the first random variable and of the second private value.

3. The second system of claim 1 wherein the randomized value is computed by adding a negative value of a product of the first random variable and of the second private value to a negative value of a second random variable, wherein the second random variable is larger than zero and less than the first random variable.

4. The second system of claim 1 wherein the third encrypted value is equal to the product.

5. The second system of claim 1 wherein the third encrypted value is equal to the product in case of a positive result of a random decision and wherein the third encrypted value is equal to the product to the power of a modulus value of the public key reduced by one and in case of a negative result of the random decision.

6. The second system of claim 1 wherein the homomorphic function is a randomized homomorphic function so that encrypted values are semantically secure.

7. The second system of claim 1 the communication unit further configured to send information about a domain comprising the second private value to the first system.

8. The second system of claim 1 the communication unit further configured to receive information about a domain that comprises the first private value and the second private value and configured to send a lower limit for a modulus value of the public key to the first system and the processing unit further configured to determine the lower limit for the modulus value from a difference between an upper limit of a domain and a lower limit of the domain so that the greater-than comparison is error-free.

9. A second computer-implemented method for providing a second private value to a greater-than comparison of a first private value accessible to a first party and the second private value accessible to a second party, the method comprising:
   accessing the second private value;
   receiving a first encrypted value computed by encrypting the first private value using a homomorphic encryption function and a public key;
   computing a second encrypted value by encrypting a randomized value using the homomorphic encryption function and the public key, the randomized value being calculated from a first random variable and the second private value, wherein the first random variable is greater than zero;
   computing a third encrypted value comprising a function of a product of the first encrypted value to the power of the first random value and of the second encrypted value; and
   sending the third encrypted value to the first party.

10. The second method of claim 9 wherein the randomized value is equal to a negative value of a product of the first random variable and of the second private value.

11. The second method of claim 9 wherein the randomized value is computed by adding a negative value of a product of the first random variable and of the second private value to a negative value of a second random variable, wherein the second random variable is greater than zero and less than the first random variable.

12. The second method of claim 9 wherein the third encrypted value is equal to the product.

13. The second method of claim 9 including making a random decision and wherein the third encrypted value is equal to the product in case of a positive result of the random decision and wherein the third encrypted value is equal to the product to the power of a modulus value of the public key reduced by one and in case of a negative result of the random decision.

14. The second method of claim 9 wherein the homomorphic function is a randomized homomorphic function so that encrypted values are semantically secure.

15. The second method of claim 9 including sending information about a domain comprising the second private value to the first party.

16. The second method of claim 9 further:
   receiving information about a domain that comprises the first private value and the second private value;
   determining a modulus value of the public key from a difference between an upper limit of the domain and a lower limit of the domain so that the greater-than comparison is error-free; and
   sending the modulus value to the first party.

17. A non-transitory second computer program product comprising instructions for a computer system that cause the computer system to execute method operations of claim 9.

* * * * *